United States Patent Office 3,454,596
Patented July 8, 1969

3,454,596
ADDITION REACTIONS TO CARBONYL
COMPOUNDS
Lyle A. Hamilton, Pitman, N.J., assignor to Mobil Oil
Corporation, a corporation of New York
No Drawing. Filed June 3, 1964, Ser. No. 372,408
Int. Cl. C07c 41/00; C07d 15/00, 89/14
U.S. Cl. 260—327                    20 Claims

ABSTRACT OF THE DISCLOSURE

A process for producing polyethers and polythioethers comprising effecting reaction of a carbonyl compound, i. e., an aldehyde or ketone, with a substituted aliphatic compound, i.e., an alcohol, mercaptan or ortho ester, in the presence of a catalyst comprising a crystalline alumino-silicate having an ordered internal structure with a defined pore size of from at least about 5.9 A. to about 15 A. in diameter.

---

This invention relates to addition reactions to carbonyl compounds in the presence of unique solid catalysts and in particular to the addition of alcohols and/or mercaptans or ortho esters to carbonyl compounds in the presence of alumino-silicate catalysts.

This invention contemplates a process for effecting reaction of aldehydes and/or ketones with alcohols and/or mercaptans or ortho esters in the presence of a catalyst comprising an alumino-silicate having an ordered internal structure. More particularly, this invention is directed to a process for producing aliphatic and/or cyclic addition products, including dialkoxy- and bis (alkylthio) hydrocarbons, m-dioxanes, 1,3-dioxolanes, 1,3-dithiolanes and the like, by effecting condensation of the carbonyl groups, as described, under certain conditions in the presence of an alumino-silicate catalyst from which the desired products can be easily and substantially recovered.

The carbonyl compounds that can be reacted in accordance with this invention may be represented by the following general formula:

(I)

wherein R is a member selected from the group consisting of a monovalent hydrocarbon radical and hydrogen; and y is an integer from 1 to 2; the monovalent hydrocarbon radical containing from 1 to 15 carbon atoms.

The term "monovalent hydrocarbon radical" as used herein is intended to include alkyl, cycloalkyl, alkenyl, and aryl radicals as well as substituted derivatives thereof.

Exemplary of such radicals are the following: alkyl radicals, such as methyl, ethyl, n-propyl, isopropyl, n-butyl, t-butyl, n-hexyl, 2-ethyl-n-hexyl, n-octyl, n-dodecyl, and the like; cycloalkyl radicals, such as cyclohexyl and the like; alkenyl radicals such as ethenyl (vinyl), propenyl, 1-butenyl, 2-butenyl, 3-butenyl, 1-pentenyl, 2-pentenyl, 3-pentenyl, 4-pentenyl, and the like; alkyl alkenyl such as 2-methyl-1-butenyl, 3-methyl-1-pentenyl, and the like; aralkyl radicals, such as benzyl, 2-phenylethyl, 3 - phenyl - n - propyl, 1-phenyl-n-butyl, 1-phenyl-n-dodecyl, and the like; aryl radicals, such as phenyl, naphthyl, and the like; alkaryl radicals, such as o-methylphenyl, p-ethylphenyl, p-n-propylphenyl, o-npropylphenyl, o-n-butylphenyl, p-n-dodecylphenyl, p-(2-ethyl-n-hexyl), phenyl, and the like; halogenated alkyl and cycloalkyl radicals, such as chloroethyl, bromoethyl, fluoroethyl, 2-chloro-n-propyl, 2-bromo-n-propyl, 2-chloro-n-butyl, 3-chloro-n-amyl, 3-bromo-n-amyl, 2-chloron-hexyl, 2-chlorocyclohexyl, and the like; halogenated aryl radicals, such as p-chlorophenyl, p-bromophenyl, p-fluorophenyl, p-iodophenyl, 2-chloronaphthyl, 2-bromonaphthyl, and the like. It will be appreciated that in some instances, other substituent groups, including nitro, oxo, formyl, hydroxy, and the like, may also be attached to the hydrocarbon radicals.

Among the ketones that can serve as reactants are aliphatic ketones, i.e., acetone, butanone, 3-pentanone, 2-pentanone, 1-chloro - 2 - propanone, 2,4-pentanedione, 2,5-hexanedione, and the like; alicyclic ketones, i.e., cyclobutanone, cyclopentanone, 1-cyclohexyl-2-methyl-1-propanone cyclohexanone and the like; aromatic ketones, i.e., acetophenone, propiophenone, butyrophenone, 1-phenyl-2-propanone, acetonaphthanone, propionaphthanone, 1-phenyl-1,2-hexanedione, and the like. In general, these carbonyl compounds may contain from 3 to 15 carbon atoms within their molecular moieties.

The aldehydes used by the present process are acyclic or aromatic compounds that contain from about 1 to about 15 carbon atoms; those containing from 1 to 10 carbon atoms being preferred. In addition polymers of the aldehydes such as paraformaldehyde (polyoxymethylene) and paraldehyde that will decompose under the reaction conditions of this process to produce the lower molecular weight aldehydes such as formaldehyde, may be used. Exemplary of the suitable reactive aldehydes are the acyclic aldehydes, i.e., formaldehyde, acetaldehyde, propionaldehyde, butyraldehyde, paraformaldehyde, valeraldehyde, isovaleraldehyde, malonaldehyde, 1,5-pentane dicarboxaldehyde, and the like; alicyclic aldehydes, i.e., cyclohexanecarboxaldehyde and the aromatic aldehydes, i.e., benzaldehyde, p - methylbenzaldehyde, naphthaldehyde, anthraldehyde, phthalaldehyde, 2,3-naphtholene dicarboaldehyde and the like; including ortho substituted aromatics, i.e., 2,5-dichlorobenzaldehyde, 2-chlorobenzaldehyde and the like. It will be appreciated that these carbonyls may be employed in aquaous solutions or with inert organic solvents, preferably in organic solvents.

Furthermore, it will be appreciated that the carbonyl compounds may be used either in liquid or gaseous state and that those which are solids at the reaction temperatures are employed in an organic solvent carrier.

In accordance with this invention, the aldehydes react with mono- or polyhydric alcohols (or the corresponding mercaptans) to form aliphatic and cyclic addition products, i.e., dimethoxymethane, 1,3-dioxolane, and the like. In contrast, the ketones are substantially non-reactive with the simple mono-hydric alcohols (or the corresponding mercaptans) and therefore do not form aliphatic addition products. The ketones, instead, react with poly-hydric alcohols (or mercaptans) to form cyclic addition products, i.e., 2,2-dimethyl-1,3-dioxolane, and the like.

Advantageously, it has been found that aliphatic addition products can be produced from ketones, as well as from aldehydes, by reaction with ortho esters in the presence of the aluminosilicate catalyst of this invention. The preferred ortho esters are orthoformate esters which have the general formula:

(II)  HC(OR′)₃ wherein R is an alkyl radical, an arylradical, an aralkyl radical, or cycloalkyl radical containing from 1 to 10 carbon atoms. Exemplary of the orthoformates suitable for the purposes of this invention are trimethyl orthoformate, triethyl orthoformate, tripropyl orthoformate, triphenyl orthoformate, trinaphthyl orthoformate, tricyclohexyl orthoformate and the like.

The alcohols and mercaptans suitable as reactants for this invention may be represented by the following general formula:

(III)  R″(XH)ₙ wherein R″ is an alkyl radical, an aralkyl radical, an aliphatic divalent radical or an aliphatic polyvalent radical, X is oxygen or sulfur, and n is an integer from 1 to 4, depending on the identity of R″; with the alkyl and aralkyl radicals containing from 1 to 15 carbon atoms and the aliphatic radicals containing from 2 to 15 carbon atoms.

Representative of the alcohols are the monohydric alcohols such as methanol, ethyl alcohol, isopropyl alcohol, n-propyl alcohol, n-butyl alcohol, isobutyl alcohol, t-butyl alcohol, n-amyl alcohol, iso-amyl alcohol, sec-amyl alcohol, n-hexyl alcohol, 2-methyl-4-hexanol, n-octyl alcohol, n-decyl alcohol, lauryl alcohol, cyclohexanone, cetyl alcohol, benzyl alcohol, tolyl alcohol, 2-naphthol and the like; and the polyhydric alcohols such as ethylene glycol, 1,2-propanediol; 1,3-butanediol; 2-methyl-1,3-propanediol; 2,4-pentanediol; glycerol; 1,2,3-butanetriol; and the like.

The mercaptans employed as reactants include methanethiol, ethanethiol, 1-propanethiol, 2-propanethiol, 1-butanethiol, 1,2-ethanedithiol, 1,3-butanedithiol, 1,3,5-pentanetrithiol, 3-phenyl-1-mercapto-propane, and the like.

The addition products produced by this invention include a variety of polyethers and polythio ethers which may be represented by the following formulae:

(IV)          $R_2C(XR''')_2$ (V) 

wherein R (as defined in Formula I) is a monovalent hydrocarbon radical or hydrogen, X (as defined in Formula III) is oxygen or sulphur, R‴ is an alkyl or aralkyl radical, R″″ is an aliphatic divalent radical; with R‴ containing from 1 to 15 carbon atoms and R″″ containing from 2 to 15 carbon atoms. Among the products within the scope of Formulae IV and V are dialkoxy and diaryloxy hydrocarbons (often designated as acetals) such as dimethoxy methane; diethoxy methane; 1,1-diethoxy ethane; 2,2-dimethoxy butane; 2,2-diethoxy propane; diphenoxy methane; 1,1-dibutoxy toluene and the like; bis (alkylthio) and bis (arylthio) hydrocarbons such as bis (methylthio)-methane; bis (ethylthio)-methane; bis (propylthio)-methane; 2,2-bis (ethylthio)-propane; 2,2-bis (methylthio) butane; 3,3-bis (ethylthio) pentane; bis (benzylthio)-methane; 1,1-bis (benzylthio) toluene; 3-chloro-1,1-bis (ethylthio) propane; and the like; m-dioxanes, such as 5,5-dimethyl-1,3-dioxane; 2-isopropyl-5,5-dimethyl-1,3-dioxane; 2-isopropyl-5-methyl-5-propyl-1,3-dioxane; 2-phenyl-5,5-dimethyl-1,3-dioxane and the like; dioxolanes such as 2-methyl-1,3-dioxolane; 4,5-diethyl-1,3-dioxolane; 2,2-dimethyl-1,3-dioxolane; 2,2-diethyl-1,3-dioxolane; 2-phenyl-2 methyl-1,3-dioxolane; 2,4,4-trimethyl-1,3-dioxolane, and the like; dithiolanes such as 2-methyl-1,3-dithiolane, 2,2-dimethyl-1,3-dithiolane, 4,4-dimethyl-1,3-dithiolane, 2-phenyl-2-ethyl-1,3-dithiolane, and the like.

It will be appreciated that in addition to the above-described compounds, other addition products including hemiacetals, i.e., 1-methylthio-1-ethanol and the like; unsaturated ethers and sulfides, i.e., 2-methoxy-2-butene; 2-methylthio-2-propene, and the like, and saturated ethers and sulfides, i.e., methyl ethyl ether, methylthiopropane and the like, may also be formed as intermediates or as products of secondary side reactions.

The addition reactions contemplated by this invention are illustrated by the following specific equations:

Equation I.—Reaction of formaldehyde with ethyl alcohol.

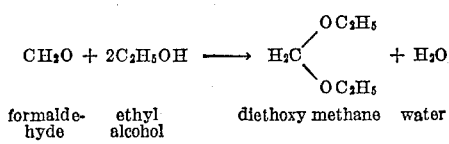

formalde-   ethyl    diethoxy methane   water
hyde    alcohol

Equation II.—Reaction of acetone with ethylene glycol.

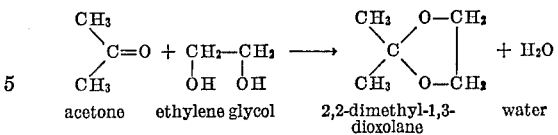

acetone   ethylene glycol   2,2-dimethyl-1,3-   water
                                          dioxolane Equation III.—Reaction of formaldehyde with ethanethiol.

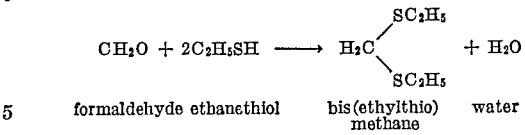

formaldehyde   ethanethiol   bis(ethylthio)   water
                                     methane Equation IV.—Reaction of acetone with trimethylorthoformate.

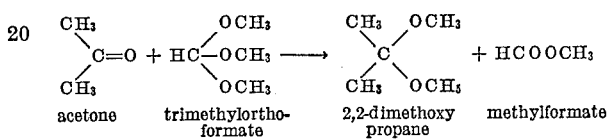

acetone   trimethylortho-   2,2-dimethoxy   methylformate
           formate         propane Equation V.—Reaction of formaldehyde with glycol.

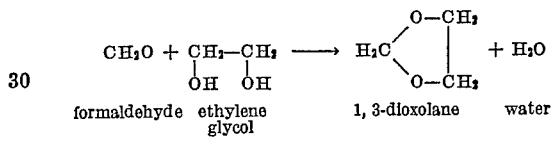

formaldehyde   ethylene   1, 3-dioxolane   water
                  glycol

Equation VI.—Reaction of acetone with 1,2-ethanedithiol.

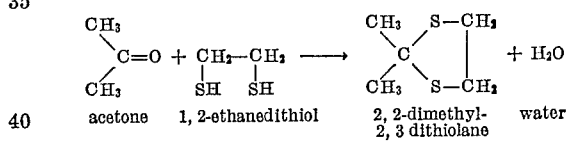

acetone   1, 2-ethanedithiol   2, 2-dimethyl-   water
                                     2, 3 dithiolane In accordance with this invention, it has been found that particularly effective catalysts are prepared from alumino-silicates that contain a high concentration of hydrogen sites within an ordered internal structure. These hydrogen sites are produced by ionically bonding or chemisorbing hydrogen ions within the molecular structure of the alumino-silicate. This bonding or chemisorption may be brought about by base exchange of the alumino-silicate with a fluid medium containing the hydrogen ions; the resulting exchanged product often having an acid character.

In addition, alumino-silicates containing a relatively small proportion of hydrogen sites can also be employed as catalysts. Thus, the alkali metal (e.g., sodium, lithium and the like) and alkaline earth metal (e.g., calcium, and the like) forms of the synthetic and naturally occurring alumino-silicates, including and the faujasites, such as zeolites "X" and "Y," can serve as catalysts. (These zeolites are hereinafter described in greater detail.)

Advantageously, the alumino-silicate catalysts having a high concentration of hydrogen sites may be prepared from a variety of naturally occurring and synthetic alumino-silicates. In general, these alumino-silicates have exchangeable metal cations (e.g., alkali metals and alkaline earth metals) that are completely or partially replaced by conventional base exchange with certain other metal cations and/or hydrogen ions.

Some alumino-silicates can be base exchanged directly with hydrogen ions to form the catalyst for this invention. However, other alumino-silicates such as zeolite X, a synthetic faujasite, are not suitable to direct base exchange with hydrogen ions, or are not structurally or thermally stable after a portion of their exchangeable metal cations have been replaced with hydrogen ions. Thus, it is often necessary to exchange other metal cations with these alumino-silicates to achieve the necessary stability within the ordered internal structure prior to the inclusion of the hydrogen ions.

Furthermore it has been determined that the alumino-silicates having at least 0.5 milliequivalent of hydrogen per gram of solid, and preferably above about 0.75 milliequivalent of hydrogen per gram of solid, are particularly effective acid catalysts for the purposes of this invention.

It will be appreciated that milliequivalents of hydrogen within the solid catalyst indicates total concentration of hydrogen ions present within the alumino-silicate and that the spatial concentration of these ions is dependent upon the ordered internal structure of the alumino-silicate being treated. Thus, alumino-silicates containing substantially the same total hydrogen ion concentration may possess different levels of catalytic activity.

It will also be apreciated that the unique activity of the catalyst for promoting the reaction is dependent not only on the concentration of hydrogen ion and/or metal cation sites found within an ordered internal structure but also on the accessibility of the sites for contacting the compounds being reacted. Because of the unique activity of the alumino-silicate catalyst for effecting the reactions of this invention is dependent on the accessibility of the active cation sites, the defined pore size of the alumino-silicate is to be considered when preparing the catalyst of this invention.

Generally, the alumino-silicate should have a pore size of at least about 5.9 A. (as evidenced by its ability to sorb at least 4 weight percent of isobutane at 25° C. and 760 mm. pressure of isobutane) so that it can accept the branched chain reactants and also accommodate the formation of cyclic reaction products within an ordered internal structure. Preferably, in order to accommodate the products of the larger molecular weight compounds, especially, the heterocyclic compounds such as 2-methyl-1.3 dioxolane and the like, the pore size is from about 7 A. to about 15 A. in diameter. It will be appreciated that the pore size selected for the alumino-silicate catalyst will depend on the reactants to be employed as well as the configuration of the reaction product that is to be produced.

In addition, the stability and distribution of active cation sites formed within the alumino-silicate is also effected by the silicon to aluminum atomic ratio within its ordered internal structure. In an isomorphic series of crystalline alumino-silicates, the substitution of silicon for aluminum in the rigid framework of the lattice, results in a decrease of total cation sites as evidenced by elemental analysis and reduction of exchanged capacity. Thus, among the faujasite isomorphs the zeolite known as "Y" will have a sparser distribution of sites within the pores than the zeolite known as "X." (These catalysts are hereinafter described in greater detail.) It has been found that alumino-silicates having a high silicon to aluminum atomic ratio are more desirable for preparing the catalysts of this invention. Preferably, the silicon to aluminum atomic ratio is at least about 1.8. These catalysts are readily treated with solutions that contain hydrogen ions and are readily regenerable after having been used by contact at elevated temperatures with an oxygen containing stream at controlled conditions such that the carbonaceous residues may be efficiently removed without damage to the essential structure and properties of the catalyst.

Typical of the alumino-silicates employed in accordance with this invention, are several alumino-silicates, both natural and synthetic, which have a defined pore size of from about 5.9 A. to about 15 A. within an ordered internal structure. These alumino-silicates can be described as a three dimensional framework of $SiO_4$ and $AlO_4$ tetrahedra in which the tetrahedra are crosslinked by the sharing of oxygen atoms whereby the ration of the total aluminum and silicon atoms to oxygen atoms is 1:2. In their hydrated form, the alumino-silicates may be represented by the formula:

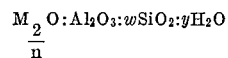

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the alumino-silicate is synthesized or occurs naturally. Typical cations include sodium, lithium, potassium, calcium, and the like. Although the proportions of inorganic oxides in the silicates and their spatial arrangement may vary, effecting distinct properties in the alumino-silicates, the two main characteristics of these materials are the presence in their molecular structure of at least 0.5 equivalents of an ion of positive valence per gram atom of aluminum, and an ability to undergo dehydration without substantially affecting the $SiO_4$ and $AlO_4$ framework.

One of the crystalline alumino-silicates utilized by the present invention is the synthetic faujasite designated as zeolite X, and is represented in terms of mole ratios of oxides as follows:

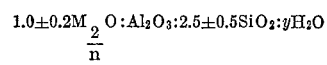

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

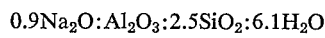

Zeolite X is commercially available in both the sodium and the calcium forms.

It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other alumino-silicates are contemplated as also being effective catalytic materials for the invention. Of these other alumino-silicates, a synthetic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

wherein W is a value greater than 3 up to about 5 and X may be a value up to about 9.

The selectivity of zeolite Y for larger molecules is appreciably the same as zeolite X because its pore size extends from 10 A. to 13 A.

Another synthesized crystalline alumino-silicate, designated as zeolite A, has been found to be effective for the purposes oft his invention. This zeolite may be represented in mole ratios of oxides as:

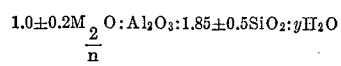

wherein M represents a metal, $n$ is the valence of M, and $y$ is any value up to about 6.

Other alumino-silicate materials found to be active in the present process are designated as mordenite and mordenite-like structures. These zeolites have an ordered crystalline structure having a ratio of silicon atoms to aluminum atoms of about 5 to 1. In its natural state mordenite usually occurs as a mixed salt of sodium, calcium and/or potassium. The pure sodium form may be represented by the following formula:

$$Na_8(AlO_2)_8(SiO_2)_{40} \cdot 24H_2O$$

Mordenite has an ordered crystalline structure made up of chains of 5-membered rings of tetrahedra. In its sodium form the crystal is believed to have a system of parallel channels having free diameters of about 4.0 A. to about 4.5 A., interconnected by smaller channels, parallel to another axis, on the order of 2.8 A. free diameters. Advantageously, in certain ionic forms, e.g. acid exchanged, the mordenite crystal can have channels with effective free diameters of from about 6.5 A. to about 8.1 A. As a result of this crystalline framework, mordenite in proper ionic forms, sorbs benzene and other cyclic hydrocarbons.

It will be appreciated that other alumino-silicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the alumino-silicate advantageously should have ordered internal structure capable of chemisorbing or ionically bonding additional metals and/or hydrogen ions within its pore structure so that its catalytic activity may be altered for a particular reaction. Among the naturally occurring crystalline alumino-silicates which can be employed are faujasite, heulandite, clinoptilolite, chabazite, gmelinite, mordenite and mordenite-like structures, and dachiardite.

Particularly effective alumino-silicate catalysts for this invention are those prepared from the class of zeolites having faujasite-like crystalline structures. One catalyst having a high concentration of hydrogen sites characterized by having a defined pore size of at least about 6 A. in diameter and a high concentration of hydrogen sites within an ordered internal structure, is prepared from the sodium form of zeolite X by a conventional treatment involving partial replacement of the sodium by contact with a fluid medium containing cations of at least one of the rare earth metals. Any medium which will effect ionization with out affecting the crystalline structure of the faujasite material may be employed. After such treatment the resulting exchanged product is water washed, dried and dehydrated. The dehydration thereby produces the characteristic system of open pores, passages, or cavities of crystalline alumino-silicates.

As a result of the above treatment, the rare earth exchanged alumino-silicate is an activated crystalline catalyst material in which the molecular structure has been changed by having metallic rare earth cations and hydrogen ions chemisorbed or ionically bonded thereto.

Accordingly, it has been found that a rare earth exchanged zeolite X catalyst that has the unique activity contemplated by this invention may contain from about 0.5 to about 1.0 milliequivalent of hydrogen per gram of solid catalyst. Furthermore, the defined pore size of the rare earth exchanged zeolite X may vary from about 6 A., generally from about 6 A. to about 15 A., and are usually in the approximate range of from about 9 A. to about 10 A. in diameter.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

It will be appreciated that the rare earth exchanged zeolite X may be also base exchanged with a fluid medium containing hydrogen ions or compounds convertible to the hydrogen ions such as ammonium chloride after it has been exchanged with the rare earth metal cations. The resulting rare earth-hydrogen exchanged zeolite X is a particularly effective acid catalyst material, because its concentration of hydrogen sites generally is greater than that of the above-described rare earth exchanged zeolite X catalyst material.

It will also be appreciated that cations of polyvalent metals other than the rare earths which have a valence of three or more may be used to replace the exchangeable metal cations from the alumino-silicates to provide other effective catalysts for this process. Typical of these metals are titanium, zirconium, vanadium, chromium, manganese, iron, aluminum and the like polyvalent metal. However, it will be understood that the chemical properties of the metal, i.e., its atomic radius, degree of ionization, hydrolysis constant, and the like, will determine its suitability for exchange with the particular alumino-silicate material. In addition, certain divalent metal cations such as calcium, barium, and magnesium, may be base exchanged together with ammonium salts (i.e., chlorides, sulfates, and the like) to provide an alumino-silicate catalyst having an acid character.

Other effective faujasite type catalysts suitable for this invention may be prepared from zeolite Y. Zeolite Y may be activated to have a high concentration of acid sites by the same base exchange techniques employed for the rare earth exchanged zeolite X catalyst. It has been found that the exchange of rare earth metals for the sodium cations within zeolite Y produces a highly active acid catalyst. However, because zeolite Y has a high acid stability resulting from its high silicon to aluminum ratio, the preferred acid catalyst prepared from this faujasite material is produced by partially replacing the sodium cations directly with hydrogen ions. This replacement may be accomplished by treatment with a fluid medium containing hydrogen ions and/or cations capable of conversion to hydrogen ions. Inorganic and organic acids represent the source of hydrogen ions, whereas ammonium solution such as the chlorides and sulfates, are representative of the fluid media containing cations capable of conversion to hydrogen ions. Accordingly, it will be appreciated that the fluid medium may contain hydrogen ions, ammonium cations, or a mixture thereof, with a pH range from about 1 to about 12.

Mordenite is activated to serve as a catalyst for the instant invention by replacement of its sodium ions with hydrogen ions. The necessary base exchange is essentially the same as that described above for the preparation of acid zeolite Y, except that mineral acids such as HCl are employed as a source of hydrogen ions. In general, the mordenite material is reduced to a fine powder (approximately passing a 200 mesh sieve and preferably passing 300 or 325 mesh sieves or finer) and then acid treated, washed of anions, dried and dehydrated to form the crystalline alumino-silicate structure.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate. Such materials include by way of examples, dried inorganic oxide gels and gelatinous precipitates or alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline alumino-silicates may be prepared by growing crystals of the alumino-silicate in the pores of the support. Also, the alumino-silicate may be intimately composited with a suitable binder, such as inorganic oxide hydrogel or clay, for example by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II-A, III-B, and IV-A of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia- zirconia. In the foregoing gels, silica is generally present as the major component and the other oxides of metals are present in minor proportion. Thus, the silica content of such gels is generally within the approximate range of about 55 to about 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal, the oxide of which it is desired to cogel with silica, etc. The relative proportions of finely divided crystalline alumino-silicate and inorganic oxide gel matrix may vary widely with the crystalline alumino-silicate content ranging from about 2 to about 90 percent by weight and more usually, particularly where the composite is prepared in the form of beads, in the range of about 5 to about 50 percent by weight of the composite.

The catalyst of alumino-silicate employed in the process of this invention may be used in the form of small fragments of a size best suited for operation under the specific conditions existing. Thus, the catalyst may be in the form of a finely divided powder or may be in the form of pellets of about $1/16''$ to about $1/8''$ in diameter, obtained upon pelleting the alumino-silicate with a suitable binder such as clay. The zeolite X, described hereinabove, may be obtained on a clay-free basis or in the form of pellets in which clay is present as a binder. The reaction temperatures vary with the selection of reactants and catalysts as well as the desired condensation products. In general, temperatures from about $-40°$ C. to about $150°$ C. are operative; preferably the reaction temperatures are from about $30°$ to $100°$ C. The lower temperatures are preferred in order to minimize undesirable side reactions.

Above about $150°$ C., side reactions resulting in the formation of saturated or unsaturated ethers and/or sulfides or their rearrangement products are predominant. Accordingly, it will be appreciated that the choice of a specific reaction temperature will be governed primarily by the condensation reaction to be effected and by the activity of the catalyst to be used..

The pressures used by this process may range from about atmospheric to pressures considerably above atmospheric. Oftentimes the pressure is autogenous, i.e., the vapor pressure of the reactants, condensation products and solvents at the reaction temperature of the process.

The amounts of reactants used may be varied over wide limits. In general, the alcohols and/or mercaptans are used in greater molar proportions, but a molar ratio of alcohol to aldehyde from about 0.5 to about 6 may be operative. Excess of alcohol is preferred to provide favorable equilibrium conditions for maximizing acetal formation.

Because several of the reactants employed, as well as a number of reaction products produced by this process, may be solid, highly volatile or difficult to handle at the desired operating conditions, inert solvent reaction media may be required to effect certain reactions. The inert solvent media are usually non-volatile and non-reactive under the reaction conditions selected for a particular reaction. Preferably, the solvent forms an azeotropic mixture with water so as to facilitate its removal from the reaction media. In general, these solvent media include toluenes, benzenes, hexane, cyclohexane, halogenated solvents (e.g., chloroform and the like) and other like solvents. It will be appreciated that removal of these solvents together with the water formed as a product of the reaction by azeotropic distillation serves to drive the reaction to completion. Furthermore when using the orthoformate esters to produce the aliphatic addition products it is preferable to use the alcohol corresponding to the ortho ester as a solvent medium for the reaction.

The amount of catalyst necessary to effect the reactions of this invention may vary considerably depending on whether the reaction is conducted as a batch-type operation, a continuous, or a semi-continuous process. Generally, during batch-type operation it has been found that the amount of catalyst may extend from about 0.05 percent by weight to about 10 percent by weight of the charge.

In continuous or semi-continuous processes where one or more reactor vessels are employed with cyclic regeneration, the amount of catalyst as measured in terms of the space velocities of the carbonyl feed (ml. feed/ml. of catalyst/hour) may be in the range from about 0.1 to about 20.0. It will be understood that during the cyclic continuous processes or subsequent to their use in batch-type operations, the catalysts of this invention may be readily regenerated by burning the contaminants off in an air stream at temperatures of about $550°$ C. for about 1 to about 3 hours.

It will be appreciated that the operating procedures and conditions used by the present process to effect the reactions are dependent upon the specific alumino-silicate catalyst employed and the reactants selected, as well as the solvents used for the reaction media.

Furthermore, conditions such as temperature, pressure, molar ratio between the reactants, time of reaction, the amount of catalyst and the phase relationship within the reaction media, will have significant effects on the resulting reaction products. Accordingly, the manner in which these conditions affect the process of this invention may be more readily understood by reference to the following specific examples.

Batch-type operations are conducted in a closed reaction vessel containing particles of the alumino-silicate catalyst. Usually, the apparatus is equipped with a stirrer and thermometer and surmounted with a drying trap and a refluxing condenser. Solutions of the carbonyl compound and the alcohol, mercaptan or orthoformate ester are charged into the reactor at room temperature and the stirrer is turned on. Then, when necessary, the azeotropic solvent, e.g., hexane, is introduced into the reactor. The temperature of the vessel is then raised to the reaction temperature. Because the reaction is often exothermic, the vessel is heated with an electrical resistance heater which can be controlled to maintain the temperature of the vessel at the desired level. After the reaction is complete as evidenced by reduction in the evolution of water, or other side products the stirrer is stopped. Then the reaction mixture is separated from the catalyst by filtration and often the catalyst is washed of product with an organic solvent. The resulting organic layer is then distilled to separate the reaction products. In some cases the product is crystallized from the solvent and medium by concentration and cooling. Infrared techniques and vapor phase chromatography are used to analyze the products.

The continuous processes are conducted in a metal pipe reactor (having an inside diameter of approximately 1″) provided with an electrical resistance heating element wrapped around its outer periphery. After the reactor has been loaded with the alumino-silicate catalyst the carbonyl compound is introduced in an inert solvent medium or in some case with an alcohol. A separate stream of the alcohol or mercaptan is metered under pressure into the reactor. Simultaneously, the temperature of the reactor is raised to the reaction temperature. The reactants are now added over extended periods of time and the products are collected and separated by azeotropic distillation. Fractionation of the residue usually separates the remaining reaction products while crystallization may be employed with solid products. Each product is analyzed by infrared techniques.

EXAMPLE I

Two grams of powdered rare earth exchanged zeolite X catalyst are charged into a batch-type reaction vessel. Then 81 grams of a hexane solution (37 percent) of formaldehyde is introduced into the reactor and a separate stream of 124 grams of ethylene glycol are metered into the reaction vessel (equivalent to a 1:2 molar ratio). The temperature of the reaction vessel is raised to about 70° C. under the autogenous pressure. After several minutes the reaction is complete and the products then separated and analyzed. Sixty grams of 1,3 dioxolane was obtained.

EXAMPLE II

Forty-six grams of ethanol and six grams of formaldehyde (as trioxane) together are charged into a reaction vessel containing one gram of acid mordenite. Then agitation is started and the contents of the vessel raised to 65° C.; the pressure being autogenous. After 120 minutes the reaction is terminated. Fractionation of the separated liquid products give an 88 percent yield of the diethyl acetal (diethoxy methane).

EXAMPLE III

Using the procedure described in Example I, additional reactions are conducted using two grams of an aluminosilicate catalyst and the reactants as set forth in the following table.

TABLE 1

| Catalyst | Temp., ° C. | Carbonyl compound | Alcohol or mercaptan | Product | Percent yield |
| --- | --- | --- | --- | --- | --- |
| Hydrogen-Zeolite Y | 70 | Acetaldehyde | Ethanol | Diethylacetal | 95 |
| Do | 70 | do | Ethanethiol | Diethylthio acetal | 90 |
| Rare Earth-Zeolite X | 90 | Acetophenone | Ethylene glycol | 2-phenyl-2-methyl-1,3-dioxolane. | 85 |
| Hydrogen-Zeolite Y | 90 | do | do | do | 90 |

EXAMPLE IV

Using 1/16″ pellets of acid mordenite as the aluminosilicate catalyst with a space velocity of 5 ml. feed/ml. of catalyst/hour, a feed consisting of ethyl alcohol and acetaldehyde (the alcohol/aldehyde being in a molar ratio of 4:1), is continuously passed into the metal pipe reactor. The reaction temperature is held at 100° C. (at atmospheric pressure). After 90 minutes on stream, conversion to 1,1-diethoxy ethane is calculated to be about 40 percent based on the acetaldehyde charge.

EXAMPLE V

Using hydrogen zeolite Y as the crystalline aluminosilicate and operating procedures of Example IV, a mixture of ethyl alcohol and butyraldehyde are passed through a pipe reactor with a space velocity of 2 ml. feed/mole of catalyst/hour; the reactor being held at a temperature of 100° C. After 90 minutes on stream, a 60 percent conversion of butyraldehyde to 1.1-diethoxybutane is obtained.

EXAMPLE VI

Ten grams of 1/16″ pellets of a rare earth-hydrogen exchanged zeolite X catalyst having about 0.5 milliequivalents of hydrogen per gram of solid catalyst are placed in a metal pipe reactor. Then separate streams of methanol (64 g./hr.) and acetone (29 g./hr.) in petroleum ether are fed into the reactor at a molar ratio of 4:1. After 90 minutes on stream at a reaction temperature of 100° C., 40 grams of 2,2-dimethoxy propane is obtained.

EXAMPLE VII

Following the procedure described in Example IV, several runs are conducted over catalysts of rare earth exchanged zeolite X and hydrogen zeolite Y for reacting various carbonyl compounds with alcohols or mercaptans. The results of these runs are given below.

TABLE 2

| Catalyst, ° C. | Carbonyl | Alcohol or mercaptan | Product | Percent conv. |
|---|---|---|---|---|
| Hydrogen-Zeolite Y | Acetophenone | Ethylene glycol | 2-phenyl-2-methyl-1,3-dioxolane. | 40 |
| Do | do | 1,2-ethanedithiol | 2-phenyl-2-methyl-1,3-dithioxolane. | 45 |
| Rare Earth-Zeolite X | do | do | do | 50 |
| Do | do | Ethylene glycol | 2-phenyl-2-methyl-1,3-dioxolane. | 40 |

EXAMPLE VIII

In the following cases 12.0 grams of acetophenone (0.1 mole) and 0.1 mole of the appropriate orthoformate ester were heated at 100° C. in the presence of 0.5 gram of catalyst. The reactants and catalyst were stirred using a magnetic stirrer and coproduct alkylformate removed in a sidearm reflux takeoff device. The reaction was considered completed when alkylformate no longer distilled from the reactant mixture. Solutions were filtered to remove the solid catalyst and then distilled at atmospheric pressure.

TABLE 3

| Catalyst | Ester | Yield of ketal |
|---|---|---|
| Rare earth 13 X | Trimethylorthoformate | 85 |
| Hydrogen zeolite Y | do | 87 |
| Do | Triethylorthoformate | 85 |
| Hydrogen mordenite | do | 88 |

It will be appreciated that the examples set forth above, as well as the foregoing specification, are merely illustrative of the different addition products that may be produced by the present process and that other such products may be obtained in the presence of the alumino-silicate catalyst contemplated by this invention.

It will further be appreciated that the alumino-silicates other than those used in the examples may be employed as catalysts for this process and that various modifications and alterations may be made in the process without departing from the spirit of the invention.

What is claimed:
1. A process for producing polyethers and polythioethers which comprises effecting reaction of a carbonyl compound selected from the group consisting of aldehydes and ketones with a substituted aliphatic compound selected from the group consisting of alcohols, mercaptans and ortho esters in the presence of a catalyst consisting essentially of a crystalline alumino-silicate having active cation sites produced by base exchange with exchangeable metal cations and having an ordered internal structure with a defined pore size of from at least about 5.9 A. to about 15 A. in diameter.

2. The process of claim 1 in which said alumino-silicate catalyst is contained in and distributed throughout a matrix binder.

3. A process for producing addition products selected from the group consisting of compounds having the general formula:

$$R_2C(XR''')_2$$

and compounds having the general formula:

wherein R is a member selected from the group consisting of a monovalent hydrocarbon radical and hydrogen, X is a member selected from the group consisting of oxygen an sulfur; R''' is a radical selected from the group consisting of alkyl and aralkyl, R'''' is an aliphatic divalent hydrocarbon radical; which comprises effecting reaction of a carbonyl having the general formula:

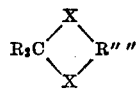

wherein R is as defined above and y is an integer from 1 to 2, with a substituted aliphatic compound selected from the group consisting of a compound having the general formula:

$$R''(XH)_n$$

wherein R'' is a radical selected from the group consisting of alkyl, aralkyl, aliphatic divalent and polyvalent radicals, X is as defined above, and $n$ is an integer from 0 to 4, depending on the identity of R', and a compound having the general formula:

$$HC(OR')_3$$

wherein R' is a hydrocarbon radical selected from the group consisting of alkyl, aryl aralkyl and cycloalkyl in the presence of a catalyst consisting essentially of a crystalline alumino-silicate having active cation sites produced by base exchange with exchangeable metal cations and having an ordered internal structure with a defined pore size of from at least about 5.9 A. to about 15 A. in diameter.

4. A process for producing polyethers and polythioethers which comprises effecting reaction of a carbonyl compound selected from the group consisting of aldehydes and ketones with a substituted aliphatic compound selected from the group consisting of alcohols, mercaptans, and ortho esters in the presence of a catalyst consisting essentially of a crystalline alumino-silicate selected from a group consisting of hydrogen exchanged zeolite Y and acid mordenite.

5. A process for producing addition products selected from the group consisting of compounds having the general formula:

$$R_2C(XR''')_2$$

and compounds having the general formula:

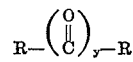

wherein R is a member selected from the group consisting of a monovalent hydrocarbon radical and hydrogen, X is a member selected from the group consisting of oxygen and sulfur; R''' is a radical selected from the group consisting of alkyl and aralkyl, R'''' is an aliphatic divalent hydrocarbon radical; which comprises effecting reaction of a carbonyl having the general formula:

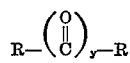

wherein R is as defined above and y is an integer from 1 to 2, with a substituted aliphatic compound selected from the group consisting of a compound having the general formula:

$$R''(XH)_n$$

wherein R'' is a radical selected from the group consisting of alkyl, aralkyl, aliphatic divalent and polyvalent radicals, X is as defined above, and $n$ is an integer from 0 to 4, depending on the identity of R', and a compound having the general formula:

$$HC(OR')_3$$

wherein R' is a hydrocarbon radical selected from the group consisting of alkyl, aryl aralkyl and cycloalkyl in the presence of a catalyst consisting essentially of a crystalline alumino-silicate selected from the group consisting of hydrogen exchanged zeolite Y and acid mordenite.

6. The process of claim 1 in which the carbonyl compound is represented by the general formula:

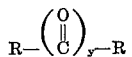

wherein R is a member selected from the group consisting of a monovalent hydrocarbon radical and hydrogen and $y$ is an integer from 1 to 2.

7. The process of claim 6 in which the monovalent hydrocarbon radical is selected from the group consisting of alkyl, cycloalkyl, alkenyl, aryl, and substituted derivatives thereof.

8. The process of claim 1 in which said alcohols and mercaptans are represented by the general formula:

$$R''(XH)_n$$

wherein $R''$ is a radical selected from the group consisting of alkyl radicals, aralkyl radicals, aliphatic divalent radicals and aliphatic polyvalent radicals, X is a member selected from the group consisting of oxygen and sulfur and $n$ is an integer from 1 to 4, depending on the identity of $R''$; $n$ being at least 2 when the carbonyl compound is a ketone.

9. The process of claim 1 in which the ortho esters are represented by the general formula:

$$HC(OR')_3$$

wherein $R'$ is selected from the group consisting of alkyl, aryl, aralkyl and cycloalkyl radicals.

10. The process of claim 1 in which said cations are selected from metal having a valence of at least 2.

11. The process of claim 1 in which said cations are of the rare earth metals.

12. The process of claim 1 in which said alumino-silicate has a silicon to aluminum atomic ratio of at least about 1.8 within an ordered internal structure.

13. The process of claim 1 in which said alumino-silicate catalyst is a rare earth exchanged faujasite.

14. The process of claim 1 in which said alumino-silicate catalyst is a rare earth-hydrogen exchanged faujasite.

15. The process of claim 1 in which said reaction is effected at a temperature from about —40° C. to about 150° C.

16. The process of claim 1 in which said reaction takes place in an inert solvent medium.

17. The process of claim 1 in which said reaction is effected at pressures from about atmospheric to superatmospheric.

18. The process of claim 3 in which said reaction is conducted at temperatures from about —40° C. to about 150° C.

19. The process of claim 3 in which the reaction is conducted in an inert solvent medium.

20. The process of claim 3 in which the alumino-silicate catalyst is a rare earth exchanged faujasite.

References Cited

Lambert Industrie Chimique Belg., vol. 26 (1961), pages 1013, 1014 and 1016.

JAMES A. PATTEN, *Primary Examiner.*

U.S. Cl. X.R.

260—609, 611, 615, 340.7, 340.9, 496